United States Patent
Liu et al.

(10) Patent No.: US 10,346,960 B2
(45) Date of Patent: Jul. 9, 2019

(54) APPARATUS AND METHOD FOR CORRECTING A FLICKER IN A VIDEO, AND VIDEO DEVICE

(71) Applicant: BOE Technology Group Co., Ltd., Beijing (CN)

(72) Inventors: Hanwen Liu, Beijing (CN); Pablo Navarrete Michelini, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 36 days.

(21) Appl. No.: 15/717,225

(22) Filed: Sep. 27, 2017

(65) Prior Publication Data

US 2018/0211371 A1 Jul. 26, 2018

(30) Foreign Application Priority Data

Jan. 25, 2017 (CN) .......................... 2017 1 0061289

(51) Int. Cl.
*G06K 9/00* (2006.01)
*G06T 5/40* (2006.01)
(Continued)

(52) U.S. Cl.
CPC .................. *G06T 5/40* (2013.01); *G06T 5/50* (2013.01); *H04N 9/646* (2013.01);
(Continued)

(58) Field of Classification Search
CPC ........ G06T 2207/10016; G06K 9/4652; G06K 9/4661; G06K 9/2027; H04N 21/44008;
(Continued)

(56) References Cited

U.S. PATENT DOCUMENTS 7,003,153 B1 * 2/2006 Kerofsky ................ G06T 5/009
348/E5.119
8,885,105 B1 * 11/2014 Cheng ..................... G06T 5/008
348/679
(Continued)

FOREIGN PATENT DOCUMENTS

CN        106028014 A       10/2016
KR        100681020 B1 *    2/2007
(Continued)

OTHER PUBLICATIONS

Flicker Correction for Archived Film Sequences Using a Nonlinear Model, Theodore Vlachos, IEEE, 1051-8215, 2004, pp. 508-516 (Year: 2004).*

*Primary Examiner* — Jayesh A Patel
(74) *Attorney, Agent, or Firm* — Arent Fox LLP; Michael Fainberg (57) ABSTRACT

The disclosure discloses an apparatus and method for correcting a flicker in a video, and a video device, the method including: determining a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user; and, determining resulting grayscale values of the current frame of video image according to the correction weight.

19 Claims, 3 Drawing Sheets

Determine a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user — S101

Determine resulting grayscale values of the current frame of video image according to the correction weight, the grayscale values of the current frame of video image, mapped grayscale values of the current frame of video image, and the contrast enhancement upper limit parameter input by the user — S102

(51) Int. Cl.
*H04N 9/64* (2006.01)
*G06T 5/50* (2006.01)
*H04N 5/21* (2006.01)

(52) U.S. Cl.
CPC ............ *G06T 2207/10016* (2013.01); *G06T 2207/20182* (2013.01); *H04N 5/21* (2013.01)

(58) Field of Classification Search
CPC ...... H04N 9/68; H04N 5/2351; H04N 5/2357; H04N 5/57; H04N 5/58; H04N 7/0132
See application file for complete search history.

(56) References Cited

U.S. PATENT DOCUMENTS

| | | | | |
|---|---|---|---|---|
| 2006/0132859 A1* | 6/2006 | Kalapathy | ............ | H04N 5/235 358/463 |
| 2006/0268180 A1* | 11/2006 | Chou | ............ | G06T 5/009 348/673 |
| 2009/0009623 A1* | 1/2009 | Hoshino | ............ | H04N 5/235 348/222.1 |
| 2009/0195697 A1* | 8/2009 | Kanumuri | ............ | G06F 17/145 348/607 |
| 2010/0214478 A1* | 8/2010 | Miyazawa | ............ | G06T 5/002 348/553 |
| 2011/0085734 A1* | 4/2011 | Berg | ............ | G06F 16/7834 382/195 |
| 2013/0100294 A1* | 4/2013 | Wu | ............ | H04N 5/33 348/164 |

FOREIGN PATENT DOCUMENTS

| | | | | |
|---|---|---|---|---|
| WO | WO 2011026839 | * | 3/2011 | ............ H04N 5/44 |
| WO | WO-2011026839 A1 | * | 3/2011 | ............ G06T 5/002 |

* cited by examiner

APPARATUS AND METHOD FOR CORRECTING A FLICKER IN A VIDEO, AND VIDEO DEVICE

This Application claims priority to Chinese Patent Application No. 201710061289.1, filed on Jan. 25, 2017, the content of which is incorporated by reference in the entirety.

FIELD

The present disclosure relates to the field of image processing, and particularly to an apparatus and method for correcting a flicker in a video, and a video device.

BACKGROUND

At present, each frame of image in a video is generally processed by performing the following operations in a blank period of time between two adjacent frames of video image: firstly a statistic is made on grayscale values of a last frame of video image, and a histogram of the last frame of video image is obtained; next a mapping table is obtained from the grayscale values of the last frame of video image using an image contrast enhancement algorithm; and lastly grayscale mapping is performed on a current frame of video image according to the mapping table to thereby obtain a processed current frame of video image.

As can be apparent from the solution above, a video image is currently processed using only the characteristic of a last frame of image, and if there is a large difference between grayscale ranges of two sequential frames, then an obvious flicker may occur while the video is being played after it has been processed as above.

SUMMARY

In view of this, embodiments of the disclosure provide an apparatus and method for correcting a flicker in a video, and a video device.

In one aspect, the present disclosure provides an apparatus for correcting a flicker in a video, the apparatus includes at least one processor and a memory, wherein the memory is configured to store computer readable program codes; the at least one processor is configured to execute the computer readable program codes to determine a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user; and to determine resulting grayscale values of the current frame of video image according to the correction weight, the grayscale values of the current frame of video image, mapped grayscale values of the current frame of video image, and the contrast enhancement upper limit parameter input by the user.

In another aspect, the present disclosure further provides a video device, the video device includes an apparatus for correcting a flicker in a video, the apparatus includes at least one processor and a memory, wherein the memory is configured to store computer readable program codes; the at least one processor is configured to execute the computer readable program codes to determine a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user; and to determine resulting grayscale values of the current frame of video image according to the correction weight, the grayscale values of the current frame of video image, mapped grayscale values of the current frame of video image, and the contrast enhancement upper limit parameter input by the user.

In still another aspect, the present disclosure further provides a method for correcting a flicker in a video, the method includes determining a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user; and determining resulting grayscale values of the current frame of video image according to the correction weight, the grayscale values of the current frame of video image, mapped grayscale values of the current frame of video image, and the contrast enhancement upper limit parameter input by the user.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

It shall be appreciated that the following descriptions of some embodiments presented herein are merely intended to illustrate and describe, but not to limit the disclosure.

Figure 1:
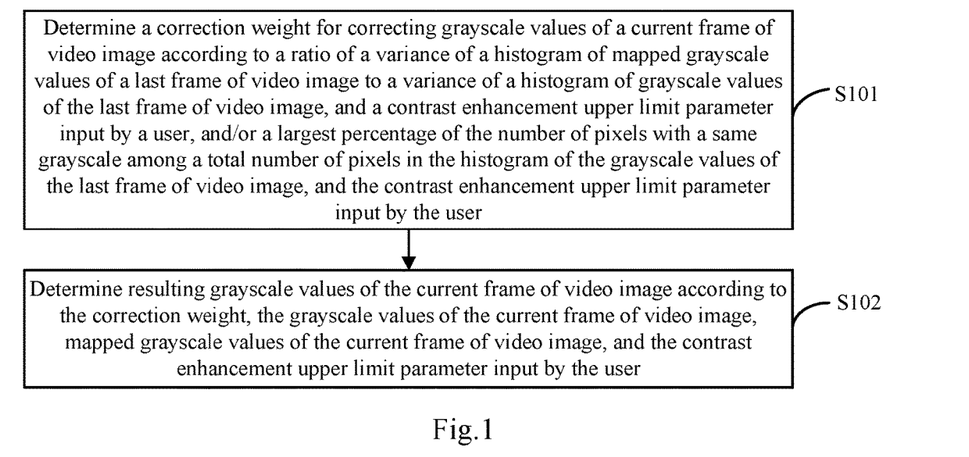
FIG. 1 is a first schematic flow chart of a method for correcting a flicker in a video according to an embodiment of the disclosure.

As illustrated in FIG. 1, a method for correcting a flicker in a video according to an embodiment of the disclosure includes the following operations.

The operation S101 is to determine a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user.

The operation S102 is to determine resulting grayscale values of the current frame of video image according to the correction weight, the grayscale values of the current frame of video image, mapped grayscale values of the current frame of video image, and the contrast enhancement upper limit parameter input by the user.

In the method above for correcting a flicker in a video according to the embodiment of the disclosure, the correction weight for correcting the grayscale values of the current frame of video image is determined according to the ratio of the variance of the histogram of the mapped grayscale values of the last frame of video image to the variance of the histogram of the grayscale values of the last frame of video image, and the contrast enhancement upper limit parameter input by the user, and/or the largest percentage of the number of pixels with the same grayscale among the total number of pixels in the histogram of the grayscale values of the last frame of video image, and thereafter the grayscale values of the current frame of video image are corrected using the correction weight, to thereby alleviate a flicker from occurring while the processed video image is being played after the current frame of video image has been processed directly according to the last frame of video image in the prior art, so as to suppress excessive enhancement, thus improving the smoothness of playing the video image.

Moreover in the prior art, the correction weight for correcting the grayscale values of the current frame of video image is determined only using the variance of the histogram of the grayscale values of the last frame of video image to thereby control the enhancement strength, but a flicker may still occur due to excessive enhancement when a part of images are processed. For example, if there is a large difference in grayscale between different areas in an image, and there is a small difference in grayscale in a same area, then there will also be a large variance of the histogram of the image, and at this time, if the correction weight for correcting the grayscale values of the current frame of video image is determined according to the variance of the histogram of the grayscale values of the last frame of video image, then it will be very likely to perform excessive enhancement, thus resulting in a significant increase in brightness in some area, and even a virtual boundary.

In view of this, in the method above for correcting a flicker in a video according to the embodiment of the disclosure, the correction weight for correcting the grayscale values of the current frame of video image is determined according to the ratio of the variance of the histogram of the mapped grayscale values of the last frame of video image to the variance of the histogram of the grayscale values of the last frame of video image, i.e., a contrast enhancement ratio, and/or the largest percentage of the number of pixels with the same grayscale among the total number of pixels in the histogram of the grayscale values of the last frame of video image, i.e., a largest grayscale proportion. As can be ascertained, the grayscale range above is narrow, and the grayscale range of the mapped grayscale values is wide, so both the contrast enhancement ratio and the largest grayscale proportion are significant, so that the proportion of the mapped grayscale values of the current frame of video image among the resulting grayscale values of the current frame of video image can be lowered, and the proportion of the grayscale values of the original image, i.e., the current frame of video image, can be improved, to thereby avoid excessive enhancement, and suppress a flicker from occurring.

In the method above for correcting a flicker in a video according to the embodiment of the disclosure, the correction weight for correcting the grayscale values of the current frame of video image can be determined in the following three schemes.

In a first scheme, the correction weight for correcting the grayscale values of the current frame of video image is determined according to the ratio of the variance of the histogram of the mapped grayscale values of the last frame of video image to the variance of the histogram of the grayscale values of the last frame of video image, the largest percentage of the number of pixels with the same grayscale to the total number of pixels in the histogram of the grayscale values of the last frame of video image, and the contrast enhancement upper limit parameter input by the user.

In some embodiments, firstly the histogram $h(f_{k-1})$ of the last frame (k−1) of video image can be obtained from the grayscale values frame (k−1) of the last frame of video image, and the variance $\sigma_{in}^2$ of the histogram of the last frame of video image, and the largest percentage M=argmax $(np_i/N)$ (i=0, 1, 2, ..., 255) of the number of pixels with the same grayscale to the total number of pixels in the histogram of the grayscale values of the last frame of video image can be calculated, where $np_i$ represents the number of pixels at the grayscale i, and N represents the total number of pixels.

Thereafter the mapped grayscale values temp(k−1) of the last frame (k−1) of video image are obtained by processing the grayscale values frame (k−1) of the last frame (k−1) of video image using a grayscale mapping table $t_{k-2}=Lut(r_{k-2})$ of the second last frame (k−2), the histogram $h(t_{k-1})$ of the mapped grayscale values of the last frame of video image is calculated, and the variance $\sigma_{out}^2$ of the histogram of the mapped grayscale values of the last frame of video image, and the ratio $R=\sigma_{out}^2/\sigma_{in}^2$ of the variance $\sigma_{out}^2$ of the histogram of the mapped grayscale values of the last frame of video image to the variance $\sigma_{in}^2$ of the histogram of the grayscale values of the last frame of video image are obtained.

In some embodiments, firstly a preliminary weight IT for correcting the grayscale values of the current frame of video image can be determined according to the ratio $R=\sigma_{out}^2/\sigma_{in}^2$ of the variance of the histogram of the mapped grayscale values of the last frame of video image to the variance of the histogram of the grayscale values of the last frame of video image, and the contrast enhancement upper limit parameter input by the user CT.

In some embodiments, the preliminary weight IT' for correcting the grayscale values of the current frame of video image can be determined as follows:

If $R < P1$ or $R > P3$, then $IT' = 0$;

If $P1 \leq R < P2$, then $IT' = \dfrac{(R-P1)}{P2-P1}CT$; and

If $P2 \leq R \leq P3$, then $IT' = \dfrac{(R-P3)}{P2-P3}CT$.

Where CT represents the contrast enhancement upper limit parameter input by the user, R represents the ratio of the variance of the histogram of the mapped grayscale values of the last frame of video image to the variance of the histogram of the grayscale values of the last frame of video image, P1 represents a first preset threshold, P2 represents a second preset threshold, and P3 represents a third preset threshold, where P1<P2<P3.

Thereafter the correction weight IT for correcting the grayscale values of the current frame of video image is determined according to the preliminary weight IT' for correcting the grayscale values of the current frame of video image, the largest percentage M of the number of pixels with the same grayscale among the total number of pixels in the histogram of the grayscale values of the last frame of video image, and the contrast enhancement upper limit parameter input by the user CT.

In some embodiments, the correction weight IT for correcting the grayscale values of the current frame of video image can be determined as follows:

If $P4 \leq M < P5$, then $IT = \dfrac{(M-P5)}{P4-P5}IT'$;

If $M > P5$, then $IT = 0$;

Otherwise, $IT = CT$.

Where CT represents the contrast enhancement upper limit parameter input by the user, IT represents the preliminary weight for correcting the grayscale values of the current frame of video image, M represents the largest percentage of the number of pixels with the same grayscale among the total number of pixels in the histogram of the grayscale values of the last frame of video image, P4 represents a fourth preset threshold, and P5 represents a fifth preset threshold, where P4<P5.

In a second scheme, the correction weight for correcting the grayscale values of the current frame of video image is determined according to the ratio of the variance of the histogram of the mapped grayscale values of the last frame of video image to the variance of the histogram of the grayscale values of the last frame of video image, and the contrast enhancement upper limit parameter input by the user.

In some embodiments, firstly the histogram $h(f_{k-1})$ of the last frame (k−1) of video image can be obtained from the grayscale values frame (k−1) of the last frame of video image, and the variance $\sigma_{in}^2$ of the histogram of the last frame of video image can be calculated.

Thereafter the mapped grayscale values temp(k−1) of the last frame (k−1) of video image are obtained by processing the grayscale values frame (k−1) of the last frame (k−1) of video image using a grayscale mapping table $t_{k-2}=Lut(r_{k-2})$ of the second last frame (k−2), the histogram $h(t_{k-1})$ of the mapped grayscale values of the last frame of video image is calculated, and the variance $\sigma_{out}^2$ of the histogram of the mapped grayscale values of the last frame of video image, and the ratio $R=\sigma_{out}^2/\delta_{in}^2$ of the variance $\delta_{out}^2$ of the histogram of the mapped grayscale values of the last frame of video image to the variance $\sigma_{in}^2$ of the histogram of the grayscale values of the last frame of video image are obtained.

Thereafter, the correction weight I' for correcting the grayscale values of the current frame of video image can be determined as follows:

If $R < P1$ or $R > P3$, then $IT = 0$;

If $P1 \leq R < P2$, then $IT = \dfrac{(R-P1)}{P2-P1}CT$; and

If $P2 \leq R \leq P3$, then $IT = \dfrac{(R-P3)}{P2-P3}CT$.

Where CT represents the contrast enhancement upper limit parameter input by the user, R represents the ratio of the variance of the histogram of the mapped grayscale values of the last frame of video image to the variance of the histogram of the grayscale values of the last frame of video image, P1 represents a first preset threshold, P2 represents a second preset threshold, and P3 represents a third preset threshold, where P1<P2<P3.

In a third scheme, the correction weight for correcting the grayscale values of the current frame of video image is determined according to the largest percentage of the number of pixels with the same grayscale to the total number of pixels in the histogram of the grayscale values of the last frame of video image, and the contrast enhancement upper limit parameter input by the user.

In some embodiments, firstly the histogram $h(f_{k-1})$ of the last frame (k−1) of video image can be obtained from the grayscale values frame (k−1) of the last frame of video image, and thereafter the largest percentage $M=\mathrm{argmax}(np_i/N)$ (i=0, 1, 2, ..., 255) of the number of pixels with the same grayscale to the total number of pixels in the histogram of the grayscale values of the last frame of video image can be calculated, where $np_i$ represents the number of pixels at the grayscale i, and N represents the total number of pixels.

Next, the correction weight IT for correcting the grayscale values of the current frame of video image can be determined as follows:

If $P4 \leq M < P5$, then $IT = \dfrac{(M-P5)}{P4-P5}CT$;

If $M > P5$, then $IT = 0$;

Otherwise, $IT = CT$.

Where CT represents the contrast enhancement upper limit parameter input by the user, M represents the largest percentage of the number of pixels with the same grayscale among the total number of pixels in the histogram of the grayscale values of the last frame of video image, P4 represents a fourth preset threshold, and P5 represents a fifth preset threshold, where P4<P5.

Among the three schemes above in which the correction weight for correcting the grayscale values of the current frame of video image is determined according to the embodiment of the disclosure, the effect of suppressing a flicker using the correction weight determined in the first scheme will be better than those in the second and third schemes.

In some embodiments, in the method above for correcting a flicker in a video according to the embodiment of the disclosure, the resulting grayscale values of the current frame of video image can be determined according to the correction weight, the grayscale values of the current frame of video image, the mapped grayscale values of the current frame of video image, and the contrast enhancement upper limit parameter input by the user in the operation S102 by determining the resulting grayscale values of the current frame of video image in an equation of:

$$T_k = \frac{IT}{CT} \cdot t_k + \frac{(CT - IT)}{CT} \cdot r_k.$$

Where $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

In some embodiments, the mapped grayscale values $t_k$ of the current frame of video image can be obtained by processing the grayscale values $r_k$ of the current frame k of video image using a grayscale mapping table $t_{k-1}=Lut(r_{k-1})$ of the last frame (k−1).

In order to better understand the method above for correcting a flicker in a video according to the embodiment of the disclosure, it will be described below in further details with reference to some embodiments thereof.

Figure 2:
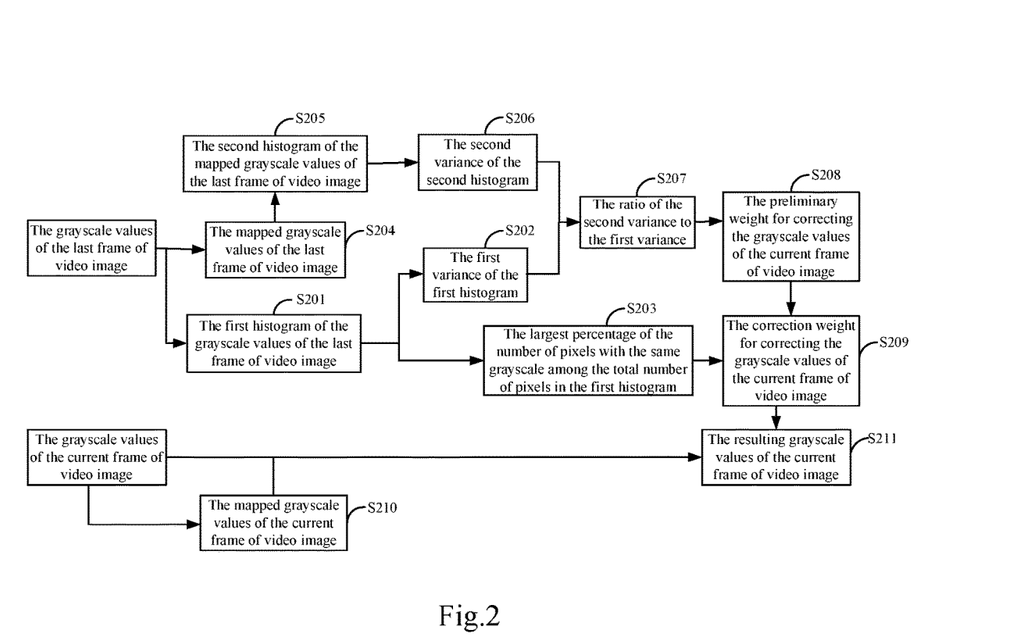
FIG. 2 is a second schematic flow chart of a method for correcting a flicker in a video according to an embodiment of the disclosure.

In one embodiment, the correction weight for correcting the grayscale values of the current frame of video image is determined as in the first scheme in the following flow as illustrated in FIG. 2.

The operation S201 is to make a statistic of the grayscale values frame (k−1) of the last frame (k−1) of video image, and to determine the first histogram $h(f_{k-1})$ of the grayscale values of the last frame of video image.

The operation S202 is to calculate the first variance $\sigma_{in}^2$ of the first histogram.

The operation S203 is to calculate the largest percentage M=argmax($np_i$/N) (i=0, 1, 2, . . . , 255) of the number of pixels with the same grayscale to the total number of pixels in the first histogram, where $np_i$ represents the number of pixels at the grayscale i, and N represents the total number of pixels.

The operation S204 is to calculate the mapped grayscale values temp(k−1) of the last frame of video image according to the grayscale values frame (k−1) of the last frame of video image, and the corresponding grayscale mapping table.

The operation S205 is to calculate the second histogram $h(t_{k-1})$ of the mapped grayscale values temp(k−1) of the last frame of video image.

The operation S206 is to calculate the second variance $\sigma_{out}^2$ of the second histogram.

The operation S207 is to calculate the ratio R of the second variance $\sigma_{out}^2$ to the first variance $\delta_{in}^2$ as the contrast enhancement ratio.

The operation S208 is to calculate the preliminary weight IT for correcting the grayscale values of the current frame of video image according to the contrast enhancement ratio R, and the contrast enhancement upper limit parameter input by the user CT; and in some embodiments, determine the preliminary weight IT for correcting the grayscale values of the current frame of video image as follows:

If $R < P1$ or $R > P3$, then $IT' = 0$;

If $P1 \leq R < P2$, then $IT' = \frac{(R - P1)}{P2 - P1}CT$; and

If $P2 \leq R \leq P3$, then $IT' = \frac{(R - P3)}{P2 - P3}CT$.

Where CT represents the contrast enhancement upper limit parameter input by the user, R represents the ratio of the second variance to the first variance, P1 represents a first preset threshold, P2 represents a second preset threshold, and P3 represents a third preset threshold, where P1<P2<P3.

The operation S209 is to determine the correction weight IT for correcting the grayscale values of the current frame of video image according to the preliminary weight IT for correcting the grayscale values of the current frame of video image, the largest percentage M of the number of pixels with the same grayscale among the total number of pixels in the first histogram, and the contrast enhancement upper limit parameter input by the user CT; and in some embodiments, determine the correction weight IT for correcting the grayscale values of the current frame of video image as follows:

If $P4 \leq M < P5$, then $IT = \frac{(M - P5)}{P4 - P5}IT'$;

If $M > P5$, then $IT = 0$;

Otherwise, $IT = CT$.

Where CT represents the contrast enhancement upper limit parameter input by the user, IT represents the preliminary weight for correcting the grayscale values of the current frame of video image, M represents the largest percentage of the number of pixels with the same grayscale among the total number of pixels in the first histogram, P4 represents a fourth preset threshold, and P5 represents a fifth preset threshold, where P4<P5.

The operation S210 is to calculate the mapped grayscale values $t_k$ of the current frame k of video image according to the grayscale values $r_k$ of the current frame of video image, and the corresponding grayscale mapping table.

The operation S211 is to determine the resulting grayscale values of the current frame of video image according to the correction weight IT, the grayscale values $r_k$ of the current frame of video image, the mapped grayscale values $t_k$ of the current frame of video image, and the contrast enhancement upper limit parameter input by the user CT; and in some embodiments, determine the resulting grayscale values of the current frame of video image in the equation of:

$$T_k = \frac{IT}{CT} \cdot t_k + \frac{(CT - IT)}{CT} \cdot r_k.$$

Where $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

Figure 3:
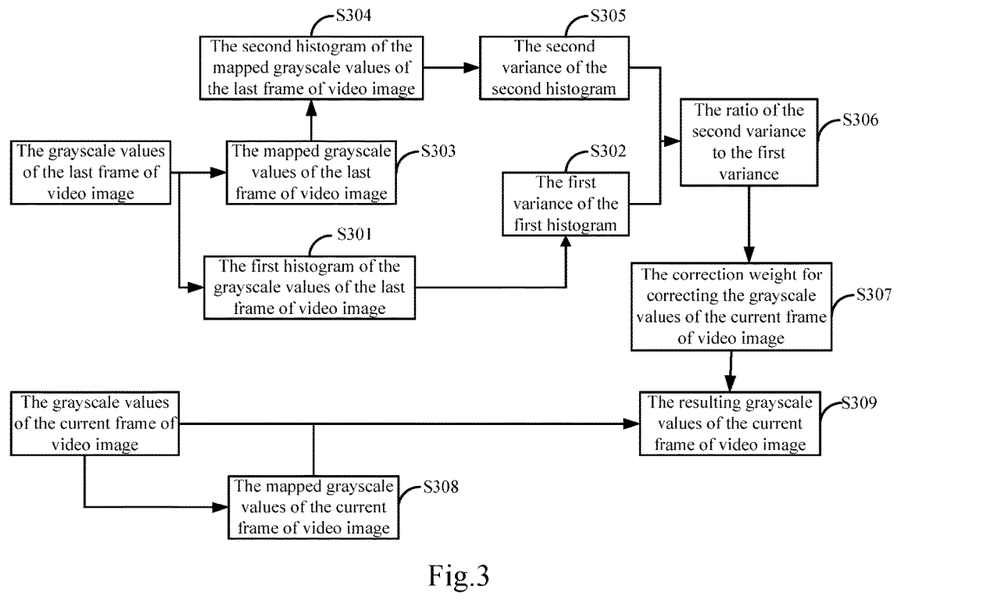
FIG. 3 is a third schematic flow chart of a method for correcting a flicker in a video according to an embodiment of the disclosure.

In another embodiment, the correction weight for correcting the grayscale values of the current frame of video image is determined as in the second scheme in the following flow as illustrated in FIG. 3.

The operation S301 is to make a statistic of the grayscale values frame (k−1) of the last frame (k−1) of video image, and to determine the first histogram $h(f_{k-1})$ of the grayscale values of the last frame of video image.

The operation S302 is to calculate the first variance $\alpha_{in}^2$ of the first histogram.

The operation S303 is to calculate the mapped grayscale values temp(k−1) of the last frame of video image according to the grayscale values frame (k−1) of the last frame of video image, and the corresponding grayscale mapping table.

The operation S304 is to calculate the second histogram $h(t_{k-1})$ of the mapped grayscale values temp(k−1) of the last frame of video image.

The operation S305 is to calculate the second variance $\sigma_{out}^2$ of the second histogram.

The operation S306 is to calculate the ratio R of the second variance $\sigma_{out}^2$ to the first variance $\sigma_{in}^2$ as the contrast enhancement ratio.

The operation S307 is to calculate the preliminary weight IT for correcting the grayscale values of the current frame of video image according to the contrast enhancement ratio R, and the contrast enhancement upper limit parameter input by the user CT; and in some embodiments, determine the preliminary weight IT for correcting the grayscale values of the current frame of video image as follows:

$$\text{If } R < P1 \text{ or } R > P3, \text{ then } IT = 0;$$

$$\text{If } P1 \leq R < P2, \text{ then } IT = \frac{(R - P1)}{P2 - P1} CT; \text{ and}$$

$$\text{If } P2 \leq R \leq P3, \text{ then } IT = \frac{(R - P3)}{P2 - P3} CT.$$

Where CT represents the contrast enhancement upper limit parameter input by the user, R represents the ratio of the second variance to the first variance, P1 represents a first preset threshold, P2 represents a second preset threshold, and P3 represents a third preset threshold, where P1<P2<P3.

The operation S308 is to calculate the mapped grayscale values $t_k$ of the current frame k of video image according to the grayscale values $r_k$ of the current frame of video image, and the corresponding grayscale mapping table.

The operation S309 is to determine the resulting grayscale values of the current frame of video image according to the correction weight IT, the grayscale values $r_k$ of the current frame of video image, the mapped grayscale values $t_k$ of the current frame of video image, and the contrast enhancement upper limit parameter input by the user CT; and in some embodiments, determine the resulting grayscale values of the current frame of video image in the equation of:

$$T_k = \frac{IT}{CT} \cdot t_k + \frac{(CT - IT)}{CT} \cdot r_k.$$

Where $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

Figure 4:
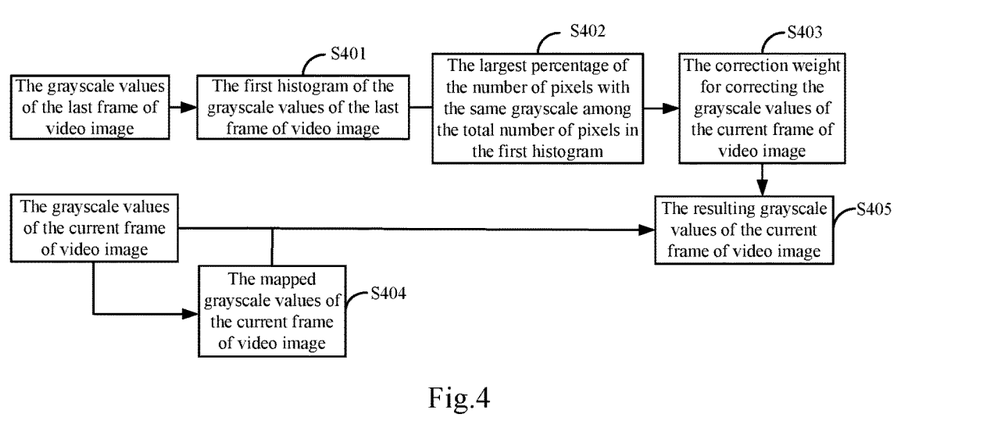
FIG. 4 is a fourth schematic flow chart of a method for correcting a flicker in a video according to an embodiment of the disclosure.

In still another embodiment, the correction weight for correcting the grayscale values of the current frame of video image is determined as in the third scheme in the following flow as illustrated in FIG. 4.

The operation S401 is to make a statistic of the grayscale values frame (k−1) of the last frame (k−1) of video image, and to determine the first histogram $h(f_{k-1})$ of the grayscale values of the last frame of video image.

The operation S402 is to calculate the largest percentage $M=\text{argmax}(np_i/N)$ (i=0, 1, 2, . . . , 255) of the number of pixels with the same grayscale to the total number of pixels in the first histogram, where $np_i$ represents the number of pixels at the grayscale i, and N represents the total number of pixels.

The operation S403 is to determine the correction weight IT for correcting the grayscale values of the current frame of video image according to the largest percentage M of the number of pixels with the same grayscale among the total number of pixels in the first histogram, and the contrast enhancement upper limit parameter input by the user CT; and in some embodiments, determine the correction weight IT for correcting the grayscale values of the current frame of video image as follows:

$$\text{If } P4 \leq M < P5, \text{ then } IT = \frac{(M - P5)}{P4 - P5} CT;$$

$$\text{If } M > P5, \text{ then } IT = 0;$$

$$\text{Otherwise, } IT = CT.$$

Where CT represents the contrast enhancement upper limit parameter input by the user, M represents the largest percentage of the number of pixels with the same grayscale among the total number of pixels in the first histogram, P4 represents a fourth preset threshold, and P5 represents a fifth preset threshold, where P4<P5.

The operation S404 is to calculate the mapped grayscale values $t_k$ of the current frame k of video image according to the grayscale values $r_k$ of the current frame of video image, and the corresponding grayscale mapping table.

The operation S405 is to determine the resulting grayscale values of the current frame of video image according to the correction weight IT, the grayscale values $r_k$ of the current frame of video image, the mapped grayscale values $t_k$ of the current frame of video image, and the contrast enhancement upper limit parameter input by the user CT; and in some embodiments, determine the resulting grayscale values of the current frame of video image in the equation of:

$$T_k = \frac{IT}{CT} \cdot t_k + \frac{(CT - IT)}{CT} \cdot r_k.$$

Where $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

Based upon the same inventive idea, an embodiment of the disclosure further provides an apparatus for correcting a flicker in a video, and a video device, and since the apparatus and the video device address the problem under a similar principle to the method above for correcting a flicker in a video, reference can be made to the implementations of the method for implementations of the apparatus and the video device, so a repeated description thereof will be omitted here.

Figure 5:
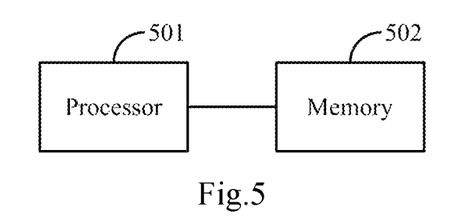
FIG. 5 is a schematic structural diagram of an apparatus for correcting a flicker in a video according to an embodiment of the disclosure.

As illustrated in FIG. 5, an apparatus for correcting a flicker in a video according to an embodiment of the disclosure includes at least one processor 501 and a memory 502, wherein the memory 502 is configured to store computer readable program codes; the at least one processor 501 is configured to execute the computer readable program codes to determine a correction weight for correcting grayscale values of a current frame of video image according to a ratio of a variance of a histogram of mapped grayscale values of a last frame of video image to a variance of a histogram of grayscale values of the last frame of video image, and a contrast enhancement upper limit parameter input by a user, and/or a largest percentage of the number of pixels with a same grayscale among a total number of pixels in the histogram of the grayscale values of the last frame of video image, and the contrast enhancement upper limit parameter input by the user; and to determine resulting grayscale values of the current frame of video image according to the correction weight, the grayscale values of the current frame of video image, mapped grayscale values of the current frame of video image, and the contrast enhancement upper limit parameter input by the user.

In a first scheme, the at least one processor 501 in the apparatus for correcting a flicker in a video according to the embodiment of the disclosure is further configured to execute the computer readable program codes to determine a preliminary weight for correcting the grayscale values of the current frame of video image according to the ratio of the variance of the histogram of the mapped grayscale values of the last frame of video image to the variance of the histogram of the grayscale values of the last frame of video image, and the contrast enhancement upper limit parameter input by the user; and to determine the correction weight for correcting the grayscale values of the current frame of video image according to the preliminary weight for correcting the grayscale values of the current frame of video image, the largest percentage of the number of pixels with the same grayscale among the total number of pixels in the histogram of the grayscale values of the last frame of video image, and the contrast enhancement upper limit parameter input by the user.

In some embodiments, the at least one processor 501 in the apparatus for correcting a flicker in a video according to the embodiment of the disclosure is further configured to execute the computer readable program codes to determine the preliminary weight IT for correcting the grayscale values of the current frame of video image as follows:

$$\text{If } R < P1 \text{ or } R > P3, \text{ then } IT' = 0;$$

$$\text{If } P1 \leq R < P2, \text{ then } IT' = \frac{(R - P1)}{P2 - P1} CT; \text{ and}$$

$$\text{If } P2 \leq R \leq P3, \text{ then } IT' = \frac{(R - P3)}{P2 - P3} CT.$$

Where CT represents the contrast enhancement upper limit parameter input by the user, R represents the ratio of the variance of the histogram of the mapped grayscale values of the last frame of video image to the variance of the histogram of the grayscale values of the last frame of video image, P1 represents a first preset threshold, P2 represents a second preset threshold, and P3 represents a third preset threshold, where P1<P2<P3.

In some embodiments, the at least one processor 501 in the apparatus for correcting a flicker in a video according to the embodiment of the disclosure is further configured to execute the computer readable program codes to determine the correction weight IT for correcting the grayscale values of the current frame of video image as follows:

$$\text{If } P4 \leq M < P5, \text{ then } IT = \frac{(M - P5)}{P4 - P5} IT';$$

$$\text{If } M > P5, \text{ then } IT = 0;$$

$$\text{Otherwise, } IT = CT.$$

Where CT represents the contrast enhancement upper limit parameter input by the user, IT represents the preliminary weight for correcting the grayscale values of the current frame of video image, M represents the largest percentage of the number of pixels with the same grayscale among the total number of pixels in the histogram of the grayscale values of the last frame of video image, P4 represents a fourth preset threshold, and P5 represents a fifth preset threshold, where P4<P5.

In a second scheme, the at least one processor 501 in the apparatus for correcting a flicker in a video according to the embodiment of the disclosure is further configured to execute the computer readable program codes to determine the correction weight IT for correcting the grayscale values of the current frame of video image as follows:

$$\text{If } R < P1 \text{ or } R > P3, \text{ then } IT = 0;$$

$$\text{If } P1 \leq R < P2, \text{ then } IT = \frac{(R - P1)}{P2 - P1} CT; \text{ and}$$

$$\text{If } P2 \leq R \leq P3, \text{ then } IT = \frac{(R - P3)}{P2 - P3} CT.$$

Where CT represents the contrast enhancement upper limit parameter input by the user, R represents the ratio of the variance of the histogram of the mapped grayscale values of the last frame of video image to the variance of the histogram of the grayscale values of the last frame of video image, P1 represents a first preset threshold, P2 represents a second preset threshold, and P3 represents a third preset threshold, where P1<P2<P3.

In a third scheme, the at least one processor 501 in the apparatus for correcting a flicker in a video according to the embodiment of the disclosure is further configured to execute the computer readable program codes to determine the correction weight IT for correcting the grayscale values of the current frame of video image as follows:

If $P4 \leq M < P5$, then $IT = \frac{(M - P5)}{P4 - P5} CT$;

If $M > P5$, then $IT = 0$;

Otherwise, $IT = CT$.

Where CT represents the contrast enhancement upper limit parameter input by the user, M represents the largest percentage of the number of pixels with the same grayscale among the total number of pixels in the histogram of the grayscale values of the last frame of video image, P4 represents a fourth preset threshold, and P5 represents a fifth preset threshold, where P4<P5.

In some embodiments, the at least one processor 501 is further configured to execute the computer readable program codes to determine the resulting grayscale values of the current frame of video image in an equation of:

$$T_k = \frac{IT}{CT} \cdot t_k + \frac{(CT - IT)}{CT} \cdot r_k.$$

Where $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

An embodiment of the disclosure provides a video device including the apparatus above for correcting a flicker in a video according to the embodiment of the disclosure. The video device can be a mobile phone, a tablet computer, a TV set, a display, a notebook computer, a digital photo frame, a navigator, or any other product or component capable of displaying.

Those skilled in the art can clearly appreciate from the foregoing description of the embodiments that the embodiments of the disclosure can be implemented in software plus a necessary general hardware platform or, of course, in hardware, although the former implementation is preferred in many cases. Based upon such understanding, the technical solutions of the embodiments of the disclosure in essence or the part thereof contributing to the prior art can be embodied in the form of a software product which can be stored in a storage medium and which includes several instructions to cause a terminal device (e.g., a mobile phone, a personal computer, a server, a network device, etc.) to perform the methods according to the respective embodiments of the disclosure.

Those skilled in the art can appreciate that the drawings are merely illustrative of preferred embodiments of the disclosure, but the modules or the flows in the drawings may not be necessary for the disclosure to be put into practice.

Those skilled in the art can appreciate that the modules in the apparatus of the embodiments can be distributed in the apparatus of the embodiments as described in the embodiments or located in one or more apparatuses different from those of the embodiments given corresponding variations. The modules of the foregoing embodiments can be integrated together or deployed separately or can be combined into one module or further subdivided into a plurality of sub-modules.

The embodiments of the disclosure have been numbered only for the sake of a convenient description but will not suggest any superiority of one embodiment to another.

In the method and apparatus above for correcting a flicker in a video, and the video device above according to the embodiments of the disclosure, the correction weight for correcting the grayscale values of the current frame of video image is determined according to the ratio of the variance of the histogram of the mapped grayscale values of the last frame of video image to the variance of the histogram of the grayscale values of the last frame of video image, and/or the largest percentage of the number of pixels with the same grayscale among the total number of pixels in the histogram of the grayscale values of the last frame of video image, and thereafter the grayscale values of the current frame of video image are corrected using the correction weight, to thereby alleviate a flicker from occurring while the processed video image is being played after the current frame of video image has been processed directly according to the last frame of video image in the prior art, so as to suppress excessive enhancement, thus improving the smoothness of playing the video image.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. An apparatus for correcting a flicker in a video, the apparatus comprising at least one processor and a memory; wherein:

the memory is configured to store computer readable program codes; and the at least one processor is configured to execute the computer readable program codes to:

determine a correction weight for correcting grayscale values of a current frame of video image according to a ratio of a variance of a histogram of mapped grayscale values of a previous frame of video image to a variance of a histogram of grayscale values of the previous frame of video image, and a contrast enhancement upper limit parameter input by a user, and/or a largest percentage of the number of pixels with a same grayscale among a total number of pixels in the histogram of the grayscale values of the previous frame of video image, and the contrast enhancement upper limit parameter input by the user; and determine resulting grayscale values of the current frame of video image according to the correction weight, the grayscale values of the current frame of video image, mapped grayscale values of the current frame of video image, and the contrast enhancement upper limit parameter input by the user;

wherein the mapped grayscale values of the previous frame of video image are obtained by processing the grayscale values of the previous frame of video image using a grayscale mapping table of a frame of video image preceding the current frame of video image by two frames;

wherein the mapped grayscale values of the current frame of video image are obtained by processing the grayscale values of the current frame of video image using a grayscale mapping table of the previous frame of video image; and a grayscale mapping table of a frame of video image is obtained by processing grayscale values of the frame of video image using an image contrast enhancement algorithm.

2. The apparatus according to claim 1, wherein the at least one processor is further configured to execute the computer readable program codes to:

determine a preliminary weight for correcting the grayscale values of the current frame of video image according to the ratio of the variance of the histogram of the mapped grayscale values of the previous frame of video image to the variance of the histogram of the grayscale values of the previous frame of video image, and the contrast enhancement upper limit parameter input by the user; and determine the correction weight for correcting the grayscale values of the current frame of video image according to the preliminary weight for correcting the grayscale values of the current frame of video image, the largest percentage of the number of pixels with the same grayscale among the total number of pixels in the histogram of the grayscale values of the previous frame of video image, and the contrast enhancement upper limit parameter input by the user.

3. The apparatus according to claim 2, wherein the at least one processor is further configured to execute the computer readable program codes to determine the preliminary weight IT' for correcting the grayscale values in the current frame of video image as follows:

$$\text{if } R < P1 \text{ or } R > P3, \text{ then } IT' = 0;$$

$$\text{if } P1 \leq R < P2, \text{ then } IT' = \frac{(R - P1)}{P2 - P1} CT; \text{ and}$$

$$\text{if } P2 \leq R \leq P3, \text{ then } IT' = \frac{(R - P3)}{P2 - P3} CT,$$

wherein CT represents the contrast enhancement upper limit parameter input by the user, R represents the ratio of the variance of the histogram of the mapped grayscale values of the previous frame of video image to the variance of the histogram of the grayscale values of the previous frame of video image, P1 represents a first preset threshold, P2 represents a second preset threshold, and P3 represents a third preset threshold, wherein P1<P2<P3.

4. The apparatus according to claim 2, wherein the at least one processor is further configured to execute the computer readable program codes to determine the correction weight IT for correcting the grayscale values of the current frame of video image as follows:

$$\text{if } P4 \leq M < P5, \text{ then } IT = \frac{(M - P5)}{P4 - P5} IT';$$

$$\text{if } M > P5, \text{ then } IT = 0;$$

$$\text{otherwise, } IT = CT,$$

wherein CT represents the contrast enhancement upper limit parameter input by the user, IT' represents the preliminary weight for correcting the grayscale values of the current frame of video image, M represents the largest percentage of the number of pixels with the same grayscale among the total number of pixels in the histogram of the grayscale values of the previous frame of video image, P4 represents a fourth preset threshold, and P5 represents a fifth preset threshold, wherein P4<P5.

5. The apparatus according to claim 4, wherein the at least one processor is further configured to execute the computer readable program codes to determine the correction weight IT for correcting the grayscale values of the current frame of video image as follows:

$$\text{if } R < P1 \text{ or } R > P3, \text{ then } IT = 0;$$

$$\text{if } P1 \leq R < P2, \text{ then } IT = \frac{(R - P1)}{P2 - P1} CT; \text{ and}$$

$$\text{If } P2 \leq R \leq P3, \text{ then } IT = \frac{(R - P3)}{P2 - P3} CT,$$

wherein CT represents the contrast enhancement upper limit parameter input by the user, R represents the ratio of the variance of the histogram of the mapped grayscale values of the previous frame of video image to the variance of the histogram of the grayscale values of the previous frame of video image, P1 represents a first preset threshold, P2 represents a second preset threshold, and P3 represents a third preset threshold, wherein P1<P2<P3.

6. The apparatus according to claim 1, wherein the at least one processor is further configured to execute the computer readable program codes to determine the correction weight IT for correcting the grayscale values of the current frame of video image as follows:

$$\text{if } P4 \leq M < P5, \text{ then } IT = \frac{(M - P5)}{P4 - P5} CT;$$

$$\text{if } M > P5, \text{ then } IT = 0;$$

$$\text{otherwise, } IT = CT,$$

wherein CT represents the contrast enhancement upper limit parameter input by the user, M represents the largest percentage of the number of pixels with the same grayscale among the total number of pixels in the histogram of the grayscale values of the previous frame of video image, P4 represents a fourth preset threshold, and P5 represents a fifth preset threshold, wherein P4<P5.

7. The apparatus according to claim 1, wherein the at least one processor is further configured to execute the computer readable program codes to determine the resulting grayscale values of the current frame of video image in an equation of:

$$T_k = \frac{IT}{CT} \cdot t_k + \frac{(CT - IT)}{CT} \cdot r_k,$$

wherein $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

8. A video device, comprising an apparatus for correcting a flicker in a video, wherein the apparatus comprises at least one processor and a memory; wherein:

the memory is configured to store computer readable program codes; and the at least one processor is configured to execute the computer readable program codes to:

determine a correction weight for correcting grayscale values of a current frame of video image according to a ratio of a variance of a histogram of mapped grayscale values of a previous frame of video image to a variance of a histogram of grayscale values of the previous frame of video image, and a contrast enhancement upper limit parameter input by the user, and/or a largest percentage of the number of pixels with a same grayscale among a total number of pixels in the histogram of the grayscale values of the last previous frame of video image, and the contrast enhancement upper limit parameter input by the user; and determine resulting grayscale values of the current frame of video image according to the correction weight, the grayscale values of the current frame of video image, mapped grayscale values of the current frame of video image, and the contrast enhancement upper limit parameter input by the user;

wherein the mapped grayscale values of the previous frame of video image are obtained by processing the grayscale values of the previous frame of video image using a grayscale mapping table of a frame of video image preceding the current frame of video image by two frames;

wherein the mapped grayscale values of the current frame of video image are obtained by processing the grayscale values of the current frame of video image using a grayscale mapping table of the previous frame of video image; and a grayscale mapping table of a frame of video image is obtained by processing grayscale values of the frame of video image using an image contrast enhancement algorithm.

9. The video device according to claim 8, wherein the at least one processor is further configured to execute the computer readable program codes to:

determine a preliminary weight for correcting the grayscale values of the current frame of video image according to the ratio of the variance of the histogram of the mapped grayscale values of the previous frame of video image to the variance of the histogram of the grayscale values of the previous frame of video image, and the contrast enhancement upper limit parameter input by the user; and determine the correction weight for correcting the grayscale values of the current frame of video image according to the preliminary weight for correcting the grayscale values of the current frame of video image, the largest percentage of the number of pixels with the same grayscale among the total number of pixels in the histogram of the grayscale values of the previous frame of video image, and the contrast enhancement upper limit parameter input by the user.

10. The video device according to claim 8, wherein the at least one processor is further configured to execute the computer readable program codes to determine the correction weight IT for correcting the grayscale values of the current frame of video image as follows:

if $R < P1$ or $R > P3$, then $IT = 0$;

if $P1 \leq R < P2$, then $IT = \frac{(R - P1)}{P2 - P1} CT$; and

If $P2 \leq R \leq P3$, then $IT = \frac{(R - P3)}{P2 - P3} CT$, wherein CT represents the contrast enhancement upper limit parameter input by the user, R represents the ratio of the variance of the histogram of the mapped grayscale values of the previous frame of video image to the variance of the histogram of the grayscale values of the previous frame of video image, P1 represents a first preset threshold, P2 represents a second preset threshold, and P3 represents a third preset threshold, wherein P1<P2<P3.

11. The video device according to claim 8, wherein the at least one processor is further configured to execute the computer readable program codes to determine the correction weight IT for correcting the grayscale values of the current frame of video image as follows:

if $P4 \leq M < P5$, then $IT = \frac{(M - P5)}{P4 - P5} CT$;

if $M > P5$, then $IT = 0$;

otherwise, $IT = CT$, wherein CT represents the contrast enhancement upper limit parameter input by the user, M represents the largest percentage of the number of pixels with the same grayscale among the total number of pixels in the histogram of the grayscale values of the previous frame of video image, P4 represents a fourth preset threshold, and P5 represents a fifth preset threshold, wherein P4<P5.

12. The video device according to claim 8, wherein the at least one processor is further configured to execute the computer readable program codes to determine the resulting grayscale values of the current frame of video image in an equation of:

$$T_k = \frac{IT}{CT} \cdot t_k + \frac{(CT - IT)}{CT} \cdot r_k,$$

wherein $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

13. A method for correcting a flicker in a video, the method comprising:

determining a correction weight for correcting grayscale values of a current frame of video image according to a ratio of a variance of a histogram of mapped grayscale values of a previous frame of video image to a variance of a histogram of grayscale values of the previous frame of video image, and contrast enhancement upper limit parameter input by a user, and/or a largest percentage of the number of pixels with a same grayscale among a total number of pixels in the histogram of the grayscale values of the previous frame of video image, and the contrast enhancement upper limit parameter input by the user; and determining resulting grayscale values of the current frame of video image according to the correction weight, the grayscale values of the current frame of video image, mapped grayscale values of the current frame of video image, and the contrast enhancement upper limit parameter input by the user;

wherein the mapped grayscale values of the previous frame of video image are obtained by processing the grayscale values of the previous frame of video image using a grayscale mapping table of a frame of video image preceding the current frame of video image by two frames;

wherein the mapped grayscale values of the current frame of video image are obtained by processing the grayscale values of the current frame of video image using a grayscale mapping table of the previous frame of video image; and a grayscale mapping table of a frame of video image is obtained by processing grayscale values of the frame of video image using an image contrast enhancement algorithm.

14. The method according to claim 13, wherein determining the correction weight for the correcting grayscale values of the current frame of video image according to the ratio of the variance of the histogram of the mapped grayscale values of the previous frame of video image to the variance of the histogram of the grayscale values of the previous frame of video image, the largest percentage of the number of pixels with the same grayscale among the total number of pixels in the histogram of the grayscale values of the previous frame of video image, and the contrast enhancement upper limit parameter input by the user comprises:

determining a preliminary weight for correcting the grayscale values of the current frame of video image according to the ratio of the variance of the histogram of the mapped grayscale values of the previous frame of video image to the variance of the histogram of the grayscale values of the previous frame of video image, and the contrast enhancement upper limit parameter input by the user; and determining the correction weight for correcting the grayscale values of the current frame of video image according to the preliminary weight for correcting the grayscale values of the current frame of video image, the largest percentage of the number of pixels with the same grayscale among the total number of pixels in the histogram of the grayscale values of the previous frame of video image, and the contrast enhancement upper limit parameter input by the user.

15. The method according to claim 14, wherein determining the preliminary weight for correcting the grayscale values of the current frame of video image according to the ratio of the variance of the histogram of the mapped grayscale values of the previous frame of video image to the variance of the histogram of the grayscale values of the previous frame of video image, and the contrast enhancement upper limit parameter input by the user comprises:

determining the preliminary weight IT' for correcting the grayscale values of the current frame of video image as follows:

if $R < P1$ or $R > P3$, then $IT' = 0$;

if $P1 \leq R < P2$, then $IT' = \frac{(R - P1)}{P2 - P1} CT$; and if $P2 \leq R \leq P3$, then $IT' = \frac{(R - P3)}{P2 - P3} CT$, wherein CT represents the contrast enhancement upper limit parameter input by the user, R represents the ratio of the variance of the histogram of the mapped grayscale values of the previous frame of video image to the variance of the histogram of the grayscale values of the previous frame of video image, P1 represents a first preset threshold, P2 represents a second preset threshold, and P3 represents a third preset threshold, wherein P1<P2<P 3.

16. The method according to claim 14, wherein determining the correction weight for correcting the grayscale values of the current frame of video image according to the preliminary weight for correcting the grayscale values of the current frame of video image, the largest percentage of the number of pixels with the same grayscale among the total number of pixels in the histogram of the grayscale values of the previous frame of video image, and the contrast enhancement upper limit parameter input by the user comprises:

determining the correction weight IT for correcting the grayscale values of the current frame of video image as follows:

if $P4 \leq M < P5$, then $IT = \frac{(M - P5)}{P4 - P5} IT'$;

if $M > P5$, then $IT = 0$;

otherwise, $IT = CT$, wherein CT represents the contrast enhancement upper limit parameter input by the user, IT represents the preliminary weight for correcting the grayscale values of the current frame of video image, M represents the largest percentage of the number of pixels with the same grayscale among the total number of pixels in the histogram of the grayscale values of the previous frame of video image, P4 represents a fourth preset threshold, and P5 represents a fifth preset threshold, wherein P4<P5.

17. The method according to claim 13, wherein determining the correction weight for the correcting grayscale values of the current frame of video image according to the ratio of the variance of the histogram of the mapped grayscale values of the previous frame of video image to the variance of the histogram of the grayscale values of the previous frame of video image, and the contrast enhancement upper limit parameter input by the user comprises:

determining the correction weight IT for correcting the grayscale values of the current frame of video image as follows:

if $R < P1$ or $R > P3$, then $IT = 0$;

if $P1 \leq R < P2$, then $IT = \frac{(R - P1)}{P2 - P1} CT$; and

If $P2 \leq R \leq P3$, then $IT = \frac{(R - P3)}{P2 - P3} CT$, wherein CT represents the contrast enhancement upper limit parameter input by the user, R represents the ratio of the variance of the histogram of the mapped grayscale values of the previous frame of video image to the variance of the histogram of the grayscale values of the previous frame of video image, P1 represents a first preset threshold, P2 represents a second preset threshold, and P3 represents a third preset threshold, wherein P1<P2<P3.

18. The method according to claim 13, wherein determining the correction weight for the correcting grayscale values of the current frame of video image according to the largest percentage of the number of pixels with the same grayscale among the total number of pixels in the histogram of the grayscale values of the previous frame of video image, and the contrast enhancement upper limit parameter input by the user comprises:

determining the correction weight IT for correcting the grayscale values of the current frame of video image as follows:

$$\text{if } P4 \leq M < P5, \text{ then } IT = \frac{(M - P5)}{P4 - P5} CT;$$

$$\text{if } M > P5, \text{ then } IT = 0;$$

$$\text{otherwise, } IT = CT,$$

wherein CT represents the contrast enhancement upper limit parameter input by the user, M represents the largest percentage of the number of pixels with the same grayscale among the total number of pixels in the histogram of the grayscale values of the previous frame of video image, P4 represents a fourth preset threshold, and P5 represents a fifth preset threshold, wherein P4<P5.

19. The method according to claim 13, wherein determining the resulting grayscale values of the current frame of video image according to the correction weight, the grayscale values of the current frame of video image, the mapped grayscale values of the current frame of video image, and the contrast enhancement upper limit parameter input by the user comprises:

determining the resulting grayscale values of the current frame of video image in an equation of:

$$T_k = \frac{IT}{CT} \cdot t_k + \frac{(CT - IT)}{CT} \cdot r_k,$$

wherein $T_k$ represents the resulting grayscale values of the current frame of video image, $t_k$ represents the mapped grayscale values of the current frame of video image, $r_k$ represents the grayscale values of the current frame of video image, IT represents the correction weight, and CT represents the contrast enhancement upper limit parameter input by the user.

* * * * *